US012680462B2

(12) United States Patent
Lemonnier et al.

(10) Patent No.: US 12,680,462 B2
(45) Date of Patent: Jul. 14, 2026

(54) COOLING-AIR INJECTION CASING FOR A TURBOMACHINE TURBINE

(71) Applicant: Safran Aircraft Engines, Paris (FR)

(72) Inventors: Jérôme Claude George Lemonnier, Moissy-Cramayel (FR); Franck Davy Boisnault, Moissy-Cramayel (FR); Antoine Bruno Van Noort, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,061

(22) PCT Filed: Sep. 21, 2022

(86) PCT No.: PCT/FR2022/051777
§ 371 (c)(1),
(2) Date: Mar. 21, 2024

(87) PCT Pub. No.: WO2023/047055
PCT Pub. Date: Mar. 30, 2023

(65) Prior Publication Data
US 2024/0384655 A1 Nov. 21, 2024

(30) Foreign Application Priority Data
Sep. 24, 2021 (FR) ........................................ 2110090

(51) Int. Cl.
*F01D 9/06* (2006.01)
*F01D 5/08* (2006.01)
(Continued)

(52) U.S. Cl.
CPC .............. *F01D 9/065* (2013.01); *F01D 5/08* (2013.01); *F01D 5/082* (2013.01); *F01D 9/06* (2013.01);
(Continued)

(58) Field of Classification Search
CPC .............. F01D 9/06; F01D 9/065; F02C 7/18
See application file for complete search history.

(56) References Cited

U.S. PATENT DOCUMENTS 5,245,821 A * 9/1993 Thomas, Jr. ............ F01D 5/082
60/806
9,777,634 B2 * 10/2017 Drake ..................... F01D 5/082
(Continued)

FOREIGN PATENT DOCUMENTS

FR 3 101 670 A1 4/2021
WO WO 2019/180365 A1 9/2019

OTHER PUBLICATIONS

International Search Report (PCT/ISA/210), issued in PCT/FR2022/051777, dated Nov. 15, 2022.

*Primary Examiner* — Christopher R Legendre
(74) *Attorney, Agent, or Firm* — Birch, Stewart, Kolasch & Birch, LLP

(57) ABSTRACT

A cooling-air injection casing for cooling a bladed rotor disc of a turbine, in particular a high-pressure turbine, this casing extending around a longitudinal axis (X-X') and being traversed by at least one channel forming an air injector, the channel including an inlet mouth and an outlet mouth. The channel includes a primary section which extends in an axial plane (P) from the inlet mouth to an elbow, and a secondary section which extends from this elbow to the outlet mouth, the secondary section having a progressive variation of its orientation with a tangential component between the elbow and the outlet mouth, in that the channel has a reduction in cross section between the inlet mouth and a neck, and in that the channel has at least one corrugation in its primary section, such that the outlet mouth is situated closer to the longitudinal axis (X-X') than the inlet mouth.

13 Claims, 7 Drawing Sheets

(51) Int. Cl.
    F01D 25/12         (2006.01)
    F02C 7/18          (2006.01)

(52) U.S. Cl.
    CPC ................ F01D 25/12 (2013.01); F02C 7/18
        (2013.01); *F05D 2230/31* (2013.01); *F05D*
    *2260/14* (2013.01); *F05D 2260/20* (2013.01);
        *F05D 2260/607* (2013.01)

(56)           References Cited

U.S. PATENT DOCUMENTS

| | | | |
|---|---|---|---|
| 10,393,023 B2 * | 8/2019 | Zelesky .................... | F02C 7/18 |
| 11,859,550 B2 * | 1/2024 | Longhurst .............. | B33Y 10/00 |
| 2012/0321453 A1 * | 12/2012 | Alvanos .................. | F01D 5/081 |
| | | | 29/889.3 |
| 2016/0123154 A1 * | 5/2016 | Manning ................ | F01D 5/147 |
| | | | 416/90 R |
| 2020/0240279 A1 | 7/2020 | Wedig et al. | |
| 2021/0033003 A1 | 2/2021 | Ovaere et al. | |
| 2022/0364470 A1 | 11/2022 | Lemonnier et al. | |
| 2024/0384655 A1 * | 11/2024 | Lemonnier ........... | B33Y 80/00 |

* cited by examiner

COOLING-AIR INJECTION CASING FOR A TURBOMACHINE TURBINE

FIELD OF THE INVENTION

The invention lies in the field of the ventilation of a turbomachine turbine, particularly the ventilation of a high-pressure turbine of a twin-spool turbomachine, such as an airplane turbojet engine.

More precisely, the invention relates to a cooling air injection casing of the rotor disc of a turbine, particularly a high-pressure turbine, of a turbomachine.

PRIOR ART

A twin-spool turbomachine in particular comprises a high-pressure turbine, which is positioned at the outlet of a combustion chamber to recover energy from the stream of combustion gas and thus rotationally drive a high-pressure compressor, disposed upstream of said combustion chamber and supplying this chamber with pressurized air (see attached FIG. 1).

In the remainder of the description and the claims, the terms "upstream" and "downstream" are to be considered with respect to the direction of flow of the air inside the high-pressure turbine, as well as inside the cooling air injection casing in accordance with the invention.

Typically, and as can be seen in the attached FIG. 1 illustrating the prior art, a high-pressure turbine A comprises a rotor disc B, disposed at the outlet of the combustion chamber C and on which are mounted turbine blades D, rotationally driven by the stream of gas expelled by this combustion chamber.

Due to the high temperatures reached by the combustion gases, the rotor disc B, and the turbine blades D that it bears, are exposed to significant thermal stresses which can cause expansions. To limit the negative impact of these thermal stresses on the lifetime of the turbine blades, these blades are supplied with inner cooling circuits which comprise ducts traversed by ventilation air drawn off the bottom of the combustion chamber.

This ventilation air is generally brought into an annular cavity by ventilation air injectors E circumferentially distributed around the longitudinal axis of the turbomachine. The injectors E extend underneath the combustion chamber and are connected to an annular circumvention space F, this annular space making it possible to convey ventilation air coming from the bottom of the compressor to the turbine of the turbomachine.

The ventilation air, leaving the injectors E, enters into an annular cavity F located upstream of the rotor disc B, traversing the orifices G formed in a sealing flange H disposed upstream of the rotor disc. The cavity F communicates with the inner cooling circuits fashioned inside the turbine blades.

The reader is referred to publications FR 2,841,591 and FR 2,937,371 which describe examples of such a high-pressure turbine architecture.

Two Aerodynamic Parameters Generally Drive the Shape of an Injector:
- the air flow rate drawn, which is calibrated by the section at the neck of an injector, and
- the tangential velocity at the outlet of the injector (or more generally the drag coefficient K) of the air which is involved in the relative total temperature, which is the total overall temperature as experienced by the rotors.

Thus, the Relative Total Temperature $T_{r,t,1}$ is Expressed as Follows:

$$T_{r,t,1} = T_{t,1} + \frac{(1-2K)\cdot(\Omega_{rotor}\cdot r)^2}{2C_p},$$

$$\text{with } K = \frac{V_{\theta,air}}{V_{\theta,rotor}} = \frac{V_{\theta,1}}{\Omega_{rotor}\cdot r}$$

where $T_{t,1}$ denotes the absolute total temperature in Kelvin K $\Omega_{rotor}$ denotes the rotor rotation velocity in rad/s r denotes the radius with respect to the engine centerline in m $C_p$ denotes the specific heat capacity at constant pressure (J/Kg/K)

$V_{\theta,air}$ denotes the tangential air velocity at the radius air r in question in m/s $V_{\theta,rotor}=\Omega_{rotor}*r$ denotes the tangential velocity of the rotor at the radius r considered in m/s.

The higher the ratio of the tangential air velocity to the drag coefficient K, the more the relative total temperature $T_{r,t,1}$ decreases.

Generally, the injectors are axial (i.e. the air circulates therein substantially parallel to an axis of rotation of the turbomachine) and are composed, either of a ring of independent holes inclined at a fixed angle, or a row of static airfoils, having the consequence of a significant overall mass.

This architecture has the advantage of drawing a low power off the rotor and not excessively promoting a temperature increase in the turbine.

Nonetheless, this architecture requires improvement to better control the sealing located near the injector and guarantee good control of the air flow rate, along with good distribution of the ventilation.

From documents FR 3,101,670 and US 2020/0240279 cooling air injection casings equipped with air injection channels are already known, but these latter do not extend in an axial plane but, on the contrary, in a plane perpendicular to the longitudinal axis of the casing. There is also known from document WO 2019/180365 a bearing support comprising an elbow duct but which does not have any corrugations as in this invention, and which serves only to supply the bearing with oil.

SUMMARY OF THE INVENTION

An Aim of the Invention is to Improve the Following Aspects:
  Improvement of the circulation of air through the injectors in order to maximize the velocity of this air at the neck of the injectors, without introducing any load loss, while reducing the risks of air delamination, thus resulting in a better robustness of the device whatever the operating point of the turbine,
  Reduction in the leakage flow rates through the sealing devices placed near the injectors, due to the fact that the outlet of the injector is placed at a radius smaller than the inlet of the injector,
  A significant reduction in the mass of the air injection casing by comparison with conventional air injection casings (by at least 50%).
  For this purpose, the invention relates to a cooling air injection casing of a bladed rotor disc of a turbine, particularly high-pressure, of a turbomachine, the casing extending around a longitudinal axis and being traversed by at least one channel forming an air injector, the channel comprising an inlet mouth and an outlet mouth.

In accordance with the invention, the channel comprises a primary segment which extends in an axial plane from the inlet mouth to an elbow and a secondary segment which extends from this elbow to the outlet mouth, the secondary segment having a gradual variation in its orientation along a tangential component between the section of the elbow and the outlet section of the outlet mouth, the channel has a reduction in section between the inlet section of the inlet mouth and the section of a neck, and the channel has at least one corrugation in its primary segment, such that the outlet mouth is located nearer to the longitudinal axis than the inlet mouth.

Owing to these features of the invention, and in particular owing to the combination of the reduction in section between the inlet mouth and the neck, owing to its orientation along a tangential component and due to the fact that the outlet mouth is located at a lower radial level than the inlet mouth, a synergy is obtained in the improvement of the cooling. Specifically, the reduction in section and the tangential orientation increases the tangential velocity component of the injected air and the fact that the outlet mouth is nearer to the longitudinal axis makes it possible to inject air at a place where the tangential velocity of the high-pressure turbine is lower.

Moreover, the corrugation makes it possible to limit the load losses in the channel and avoid the air from slowing down inside it.

According to other advantageous and non-limiting features of the invention, taken alone or in combination:

said at least one corrugation of the channel comprises from upstream to downstream with respect to the direction of circulation of the air in the channel, a first curved part, the concavity of which is oriented toward the longitudinal axis, then a second curved part, the convexity of which is oriented toward the longitudinal axis;

the outlet mouth of the channel has an outlet section which extends tangentially and in a plane perpendicular to the longitudinal axis;

the elbow is oriented such that the air stream exiting the outlet mouth circulates tangentially in the same direction as the direction of rotation of the rotor disc intended to be cooled;

the ratio of the inlet section of the inlet mouth and the section of the neck is greater than or equal to 2, preferably between 2 and 10;

the variation in the section of the channel between the inlet mouth and the neck is strictly monotonically decreasing;

the casing comprises an annular outer wall flared from upstream to downstream, a radially inner wall which extends downstream from said outer wall and which supports a radially inner sealing device, a radially outer wall which extends from said outer wall, and an end wall which joins the respective downstream ends of the radially inner wall and of the radially outer wall, this end wall extending in a plane perpendicular to the longitudinal axis, the flared annular outer wall, the radially inner wall, the radially outer wall and the end wall together delimit an annular inner cavity, the channel is disposed at least in part in this inner cavity and the outlet mouth of the channel is formed in the end wall;

the inlet mouth is formed in the flared annular outer wall and is of rectangular shape;

the inlet mouth of the channel comprises a tube of circular section, which protrudes axially and upstream from said flared annular outer wall;

the casing comprises an annular wall which extends axially downstream from said radially outer wall and which supports a radially outer sealing device;

said end wall comprises at least one dedusting hole;

the outlet mouth is of rectangular shape.

The invention also relates to a high-pressure turbine of a turbomachine comprising at least one bladed rotor disc equipped with a hub. In accordance with the invention, this turbine comprises a cooling air injection casing as aforementioned and the casing is disposed upstream of the rotor disc such that these outlet mouths are located facing the hub.

The invention also relates to a turbomachine comprising at least one cooling air injection casing as aforementioned.

The invention also relates to a method for manufacturing a cooling air injection casing as aforementioned wherein said cooling air injection casing is made by additive manufacturing.

DESCRIPTION OF THE FIGURES

Other features, aims and advantages of the invention will become apparent from the following description, which is purely illustrative and non-limiting, and which must be read with reference to the appended drawings wherein.

DETAILED DESCRIPTION OF THE INVENTION

Figure 1:
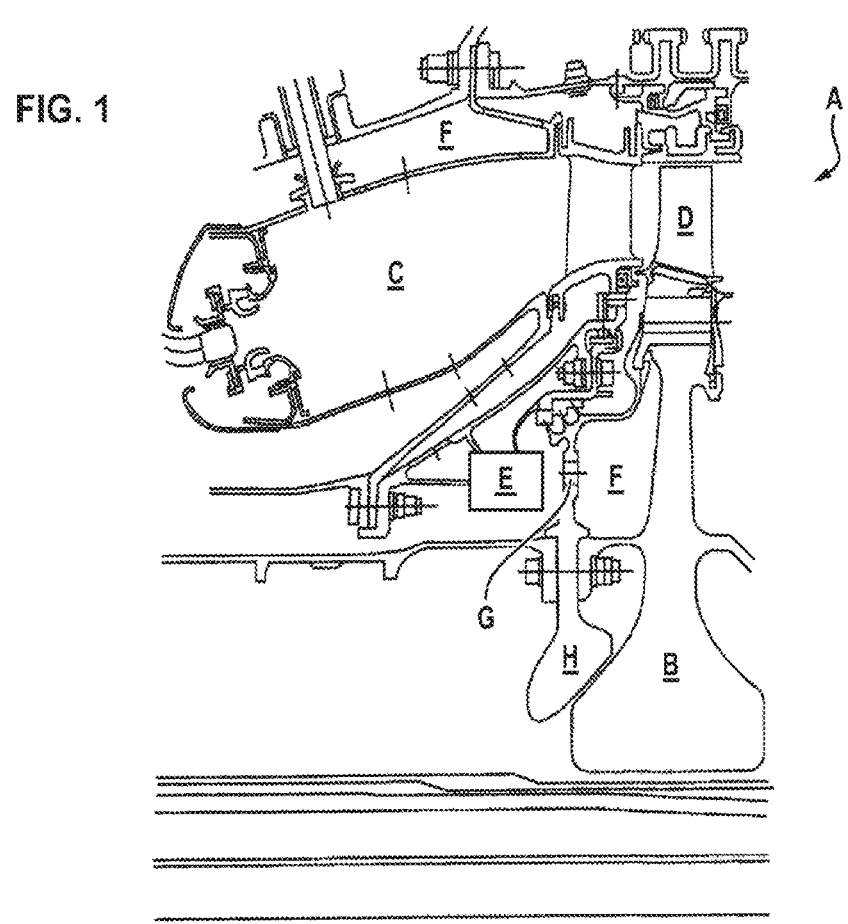
FIG. 1 is an axial section view of a part of a turbomachine of the prior art equipped with a cooling circuit for the rotor.
Figure 2:
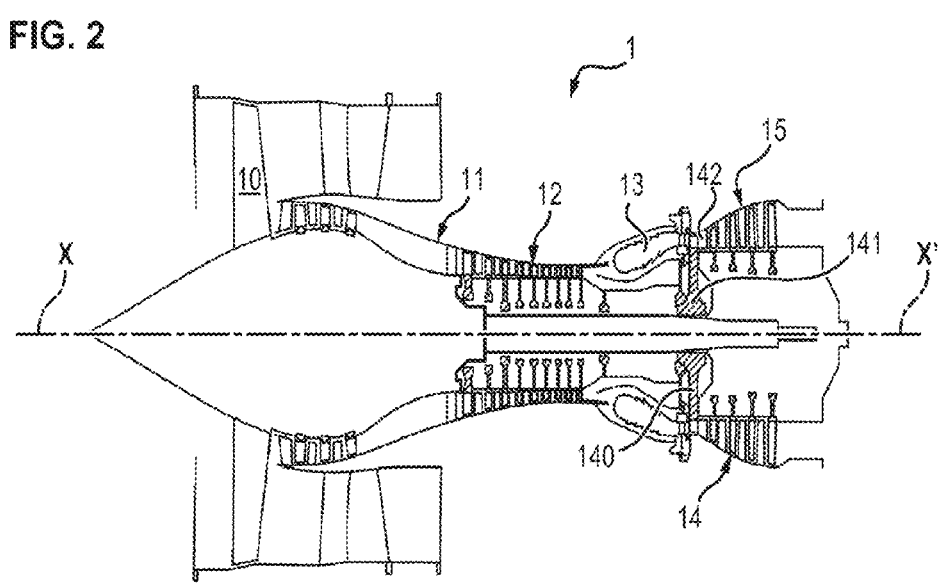
FIG. 2 is an axial section view of a turbomachine in accordance with the invention.

The invention is applicable to a turbomachine turbine, in particular to a high-pressure turbine of a twin-spool turbomachine, such as an airplane turbojet engine. Such a turbomachine is shown in FIG. 2.

On this FIGURE, it can be seen that the turbomachine 1 extends around a longitudinal axis X-X'. This turbomachine 1 comprises from left to right, i.e. from upstream to downstream with reference to the gas stream which flows there in operation: a fan 10, a low-pressure compressor 11, a high-pressure compressor 12, a combustion chamber 13, a high-pressure turbine 14 and a low-pressure turbine 15.

The high-pressure turbine 14 comprises at least one rotor disc 140 having a hub 141 and a plurality of blades 142 attached to the periphery of this hub.

The rotor disc 140 is centered on the axis X-X'.

In the rest of the description and the claims, the term "axial" denotes the direction along the axis X-X' and the term "radial" denotes a direction perpendicular to the axis X-X'.

A possible embodiment of the cooling air injection casing 2 in accordance with the invention will now be described. It has a revolution shape, of axis X-X'.

The casing 2 is traversed by at least one channel 20 which forms an air injector, preferably by several channels 20.

Each channel 20 has an inlet mouth 201 and an outlet mouth 202. The inlet mouth 201 makes it possible to draw off a part of the air located under the combustion chamber to cool the rotor.

Figure 5:
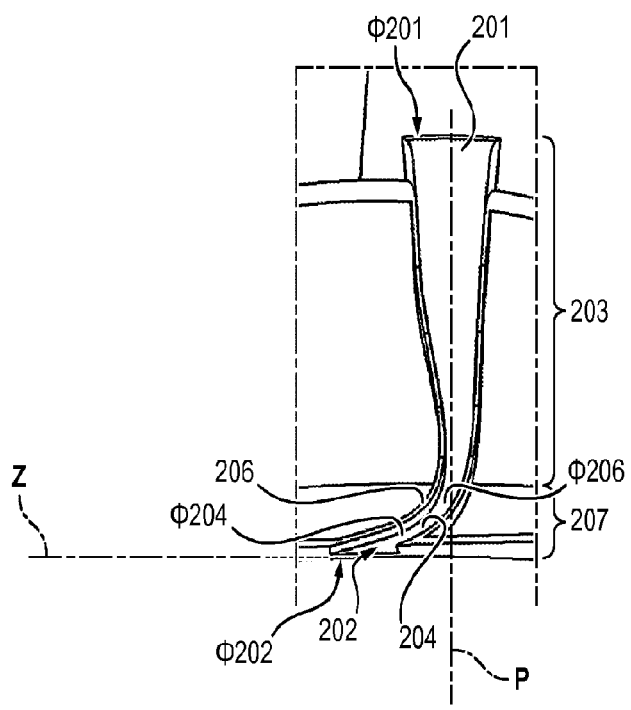
FIG. 5 is a section and top view of one of the injectors of the casing in accordance with the invention.
Figure 8:
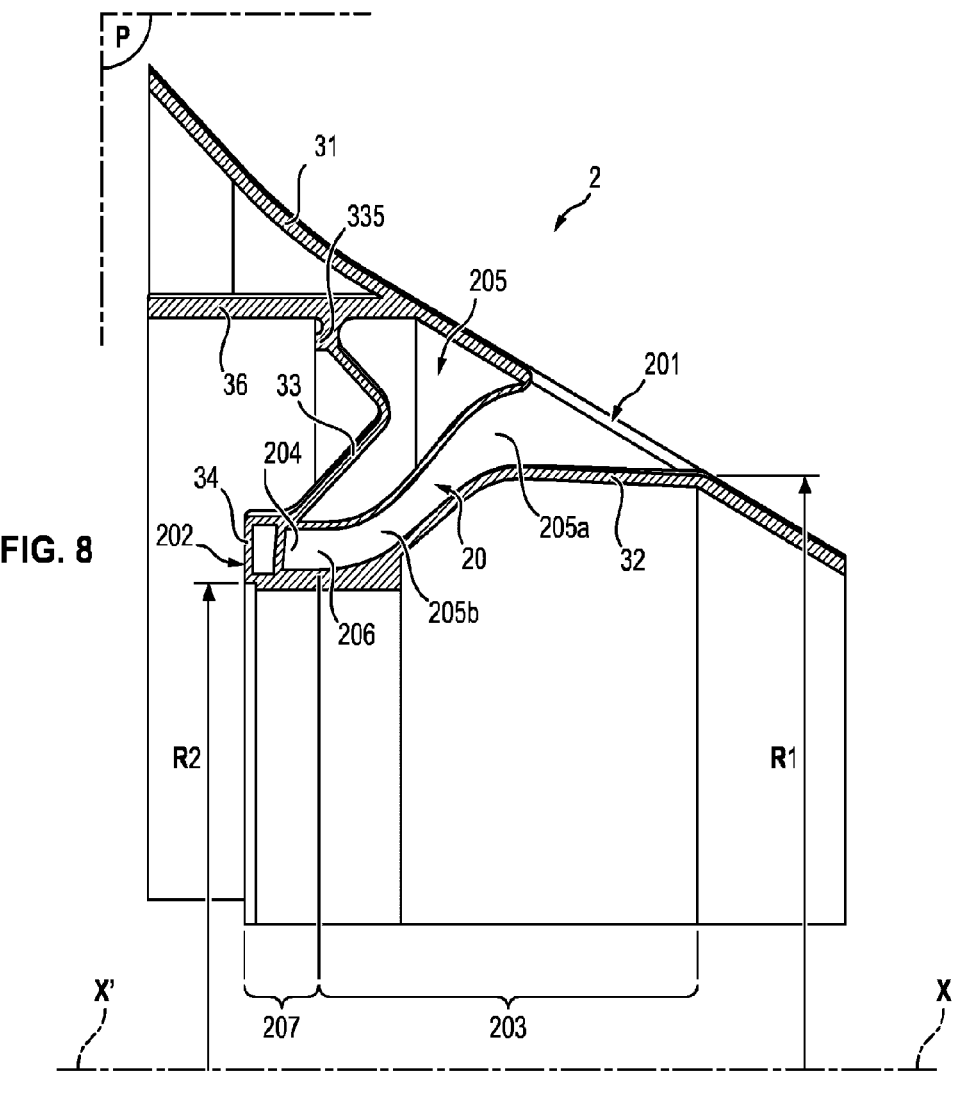
FIG. 8 is a perspective view of an angular portion of the casing in accordance with the invention, the casing being cut along an axial section plane.
Figure 9:
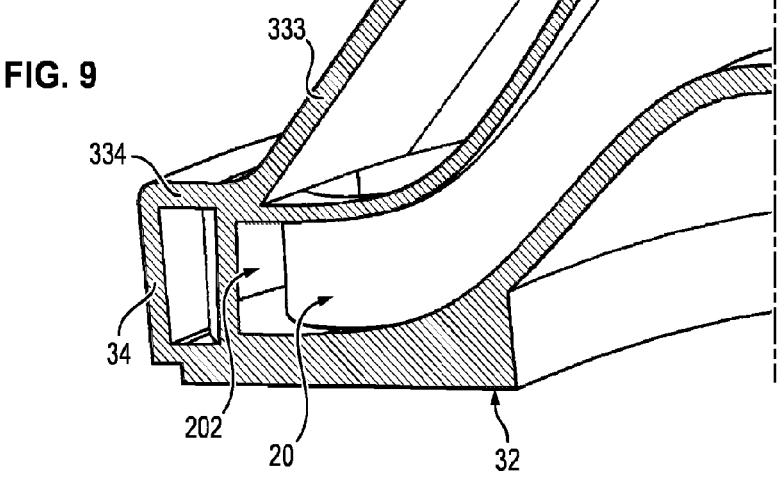
FIG. 9 is a detail view of a portion of the casing.

As can be more clearly seen in FIGS. 5 and 8, each channel 20 successively comprises from upstream to downstream a primary segment 203 then a secondary segment 207.

The primary segment 203 extends from the inlet mouth 201 to an elbow 206 in an axial plane P, this plane P including the longitudinal axis X-X'.

The secondary segment 207 extends from this elbow 206 to the outlet mouth 202.

The secondary segment 207 has a gradual variation in its orientation along a tangential component Z between the section Φ206 of the elbow 206 and the outlet section Φ202 of the outlet mouth 202. The term "gradual variation in orientation", should be understood to mean a variation in the orientation of a vector normal to the center of a section of the channel 20 and having as origin the center of said section.

Preferably, the outlet section Φ202 of the outlet mouth 202 of each channel 20 extends tangentially in a plane P1 perpendicular to the longitudinal axis X-X'. In addition, the elbow 206 is advantageously oriented such that the air stream exiting from the outlet mouth 202 tangentially circulates in the same direction as the direction of rotation of the rotor disc which faces it.

As can be seen in FIG. 8, the outlet mouth 202 is located nearer to the longitudinal axis X-X' than the inlet mouth 201. In other words, the radius R1 between the point of the inlet mouth 201 located the most radially inward is greater than the radius R2 of the point of the outlet mouth 202 located most radially inward. The drawn air is thus brought to a smaller radius R2, increasing the drag coefficient of the air, which makes it possible to cool a greater surface of the rotor and which also allows for better compression of the air in the cooling circuit of the rotor.

Each channel 20 has a reduction in section between the inlet section Φ201 of the inlet mouth 201 and the section Φ204 of a neck 204. The neck 204 thus corresponds to the point of the channel 20 which has the smallest cross-section.

Preferably, the ratio of the inlet section Φ201 of the inlet mouth 201 to the section Φ204 of the neck 204 is greater than or equal to 2. Still preferably, this ratio is between 2 and 10.

In addition, the ratio of the section of the channel 20 between the inlet mouth 201 and the neck 204 is preferably strictly monotonically decreasing.

This reduction in section makes it possible to increase the air velocity in the channel.

As can be seen in FIG. 5, advantageously, the elbow 206 is upstream of the neck 204.

Furthermore, the channel 20 has at least one corrugation 205 in the primary segment 203. This corrugation 205 extends in the axial plane P.

The term "corrugation" should be understood to mean the fact of having two successive curved portions of opposite respective orientations. Thus, the channel 20 comprises from upstream to downstream i.e. from the right to the left of FIG. 8, successively a first curved part 205a, the concavity of which is oriented toward the longitudinal axis X-X', then a second curved part 205b, the convexity of which is oriented toward the longitudinal axis (X-X').

The corrugation 205 makes it possible to limit the load losses in the channel and prevent a reduction in the velocity of the air that circulates in it.

Advantageously, the casing 2 comprises at least seven channels 20 forming injectors in order to minimize the aerodynamic heterogeneities in the cooling circuit of the rotor.

The casing 2 can have different shapes, a particular embodiment of which will now be described.

Figure 3:
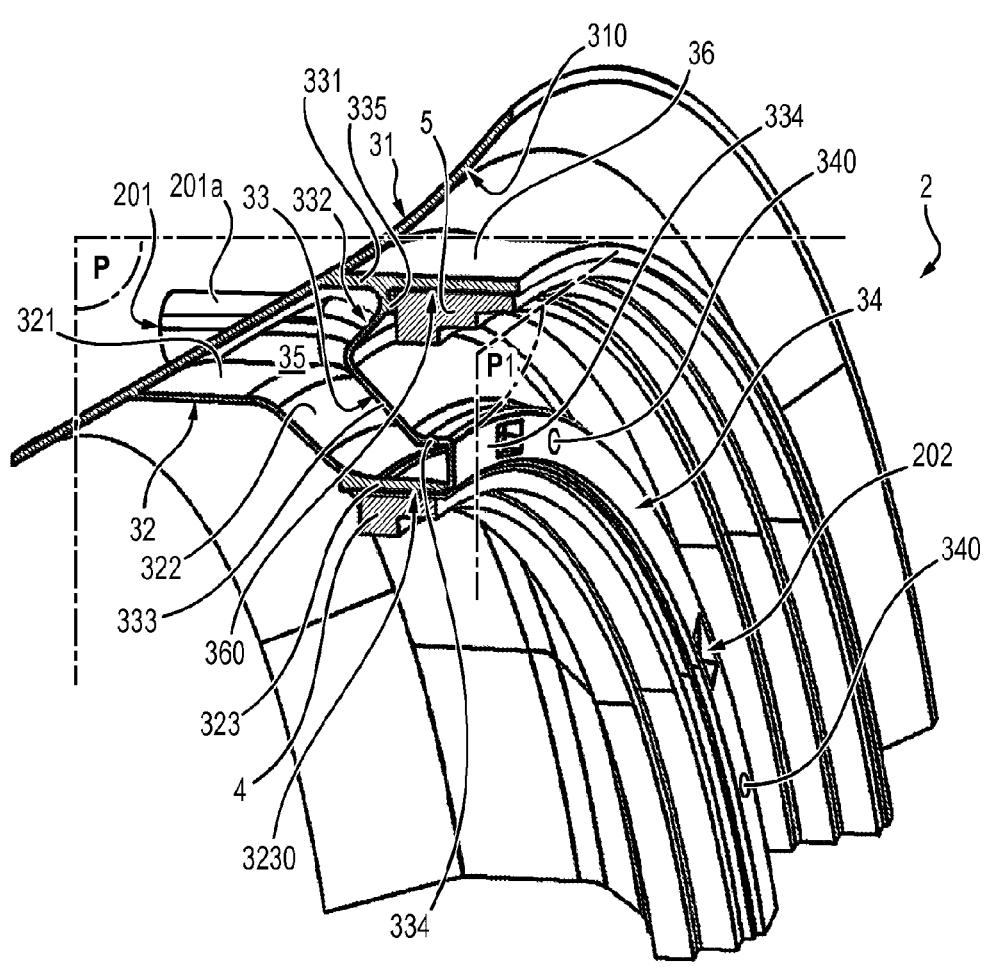
FIG. 3 is a perspective view of an angular portion of the cooling air injector annular casing in accordance with the invention.
Figure 3:
Figure 4:
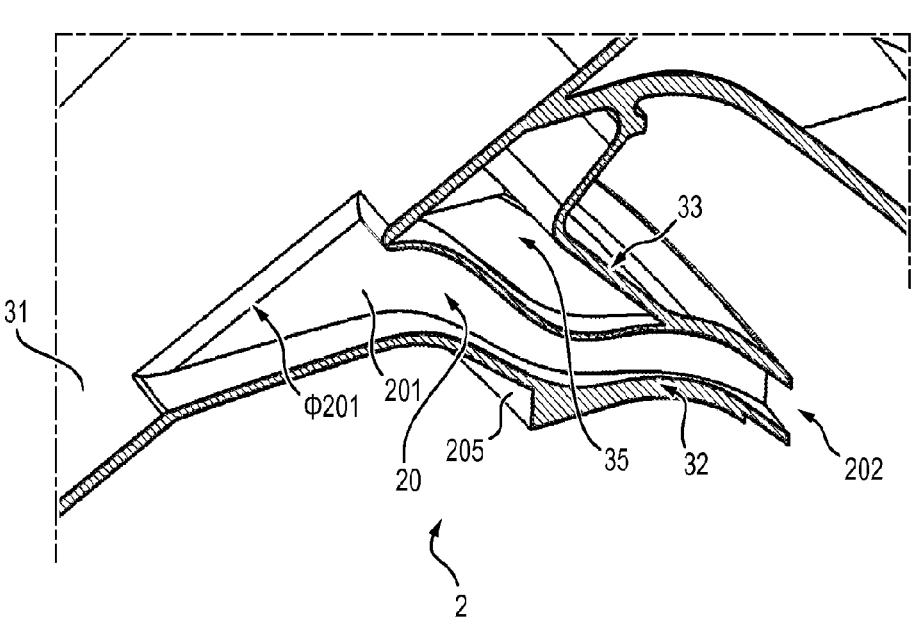
FIG. 4 is a partial perspective and axial section view of one of the injectors of the casing in accordance with the invention.

As can be seen more clearly in FIG. 3, the casing 2 comprises an annular outer wall 31, flared from upstream to downstream, a radially inner wall 32, a radially outer wall 33, an end wall 34 and an axial wall 36. These different walls are annular and centered on the axis X-X'.

The annular outer wall 31 has the function of separating the cavity located under the combustion chamber and the cavities intended to cool the high-pressure rotor.

The radially inner wall 32 extends downstream from the outer wall 31. More precisely, this wall 32 comprises a first part 321, which extends along an axial direction from the inner face 310 of the annular outer wall 31, a second part 322, which is inclined from the downstream end of the first part 321 downstream and toward a point located nearer the longitudinal axis X-X' than the first part 321 is, and finally a third part 323, which extends along an axial direction and downstream from said second part 322.

As can be more clearly seen in FIG. 8, the radially inner part of the channel 20 substantially fits the shape of the radially inner wall 32.

The radially outer wall 33 extends downstream from the outer wall 31. More precisely, this wall 33 comprises a first part 331, which extends along an axial direction from the inner face 310 of the annular outer wall 31, a second part 332, which is inclined from the downstream end of the first part 331 upstream and toward a point located nearer to the longitudinal axis X-X' than the first part 331 is, a third part 333 which is inclined from the second part 332 downstream and toward a point located even nearer to the longitudinal axis X-X' than the second part 332 is, and finally a fourth part 334, which extends along the axial direction and downstream from the third part 333.

The radially outer wall 33 has the function of separating the mixing cavity located at the outlet of the injectors into two smaller cavities, in order to preserve the high velocity of the air exiting the injectors (channels 20) and therefore an acceptable cooling efficiency of the high pressure rotor.

The end wall 34 joins the respective downstream ends of the radially inner wall 32 and of the radially outer wall 33, more precisely the respective downstream ends of the third part 323 and of the fourth part 334. This end wall 34 extends in a plane P1 perpendicular to the longitudinal axis X-X'.

The flared annular outer wall 31, the radially inner wall 32, the radially outer wall 33 and the end wall 34 together delimit an annular inner cavity 35.

The axial wall 36 extends axially downstream from the downstream end of the first part 331 of the radially outer wall 33 in the extension thereof.

Preferably, the radially inner wall 32 and more precisely its third part 323 supports a radially inner sealing device 4. This sealing device 4 is attached to the radially inner face 3230 of the third part 323.

Preferably also, the axial wall 36 supports a radially outer sealing device 5. This sealing device 5 is attached to the radially inner face 360 of the axial wall 36.

Preferably, the radially outer wall 33 is provided with an annular rib 335 which extends axially from the second part 332 and which makes it possible to axially shim the radially outer sealing device 5.

The sealing device 4 has the main function of limiting the leakage flow rate coming from the outlet of the high-pressure compressor and travelling in the direction of the cavities of the high-pressure turbine. The device 5 makes it possible to calibrate the flow rate coming from the injector and from the device 4 to be able to seal and sufficiently cool the cavity located between the high-pressure nozzle and the rotor disc of the high-pressure turbine.

The different channels 20 are formed inside the cavity 35.

Figure 6:
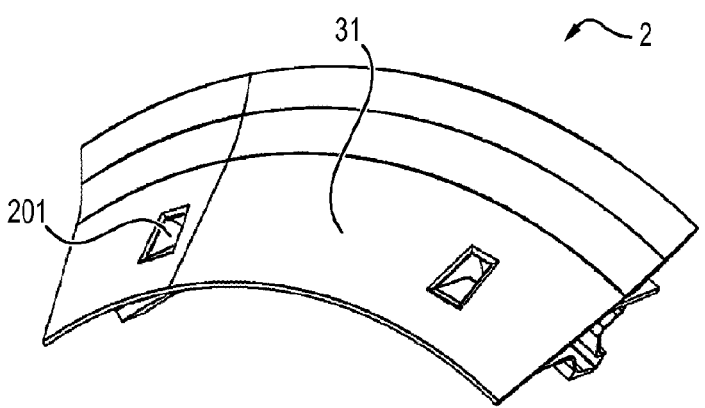
FIG. 6 is a perspective view of an angular portion of the annular cooling air injection casing in accordance with the invention, representing a first embodiment of the inlet mouth of the injectors.
Figure 7:
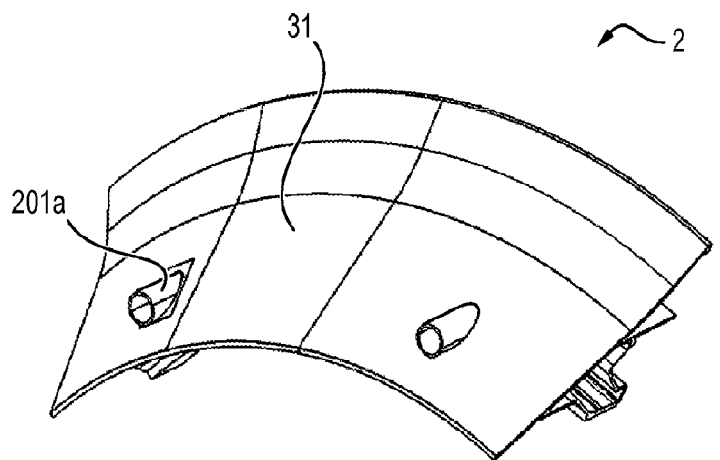
FIG. 7 is a perspective view of an angular portion of the annular cooling air injection casing in accordance with the invention, showing a second embodiment of the inlet mouth of the injectors.

As can be more clearly seen in FIGS. 6 and 7, the inlet mouth 201 of each channel 20 opens through the annular outer wall 31.

According to a first embodiment shown in FIG. 6, this inlet mouth 201 has a rectangular shape.

According to a second embodiment shown in FIG. 7, this inlet mouth comprises a tube 201a, which extends axially and in protrusion upstream from the flared outer wall 31. Thus, in the case where the turbine includes a sub-assembly which then obstructs one or more injectors, known as "variable cooling" or a mechanical sub-assembly drawing off air to cool it in a heat exchanger then sending it back to the injectors, known as "cooled cooling", the tube 201a is better adapted since it makes it possible to insert therein the tubes associated with the aforementioned subassemblies.

The outlet mouth 202 of each channel 20 opens through the end wall 34. Preferably, this outlet mouth 202 is of rectangular shape.

Figure 10:
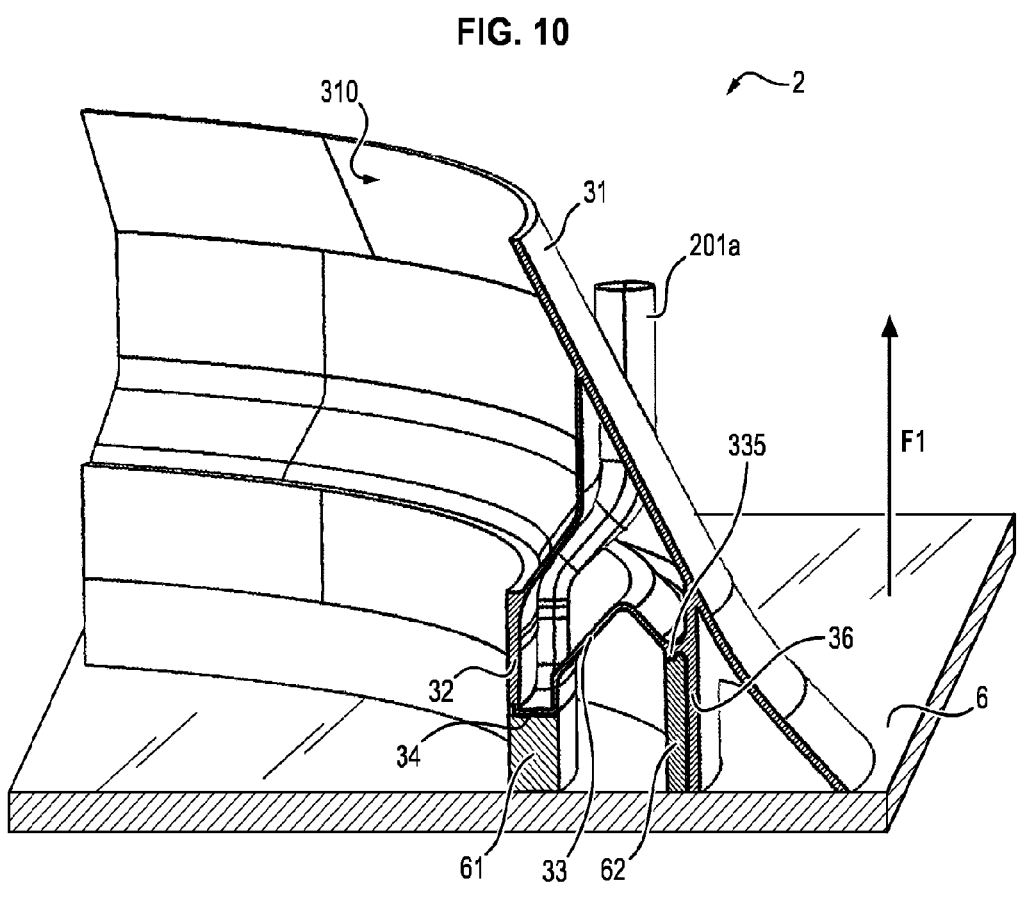
FIG. 10 is a view showing a part of the casing in accordance with the invention and the supports that are used for its manufacturing by additive manufacturing.
Figure 11:
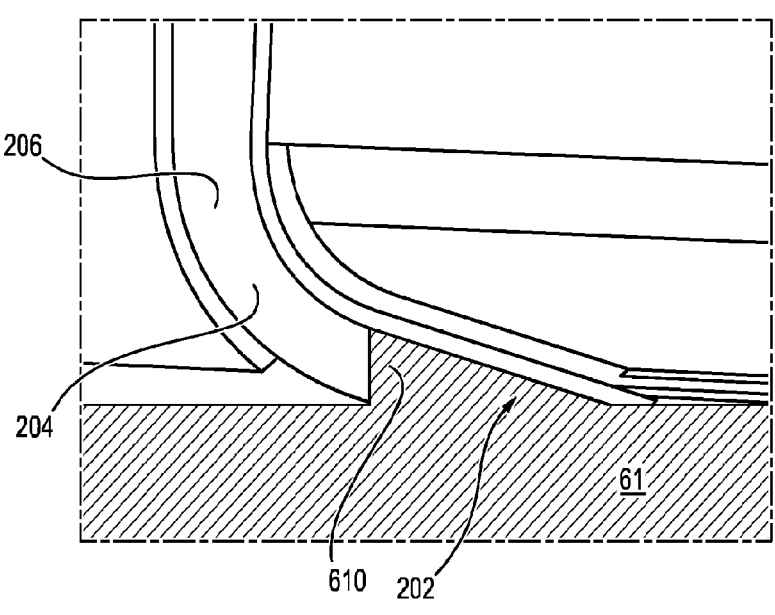
FIG. 11 is a detail view showing a part of the casing and of one of the supports of FIG. 10.

In accordance with the invention, this cooling air injection casing 2 can be manufactured by an additive manufacturing method. This method will now be described in more detail in connection with FIGS. 10 and 11.

When it is manufactured by additive manufacturing, this casing 2 has the advantage of being a single part (i.e. single-unit).

Such an additive manufacturing method can for example be a laser powder bed fusion or electron gun fusion method.

These methods consist in depositing successive layers of the powder of the material constituting the casing to be manufactured, here a metallic powder, on a horizontal manufacturing plate 6 and in fusing each powder layer with the preceding one, according to the diagram of the structure of the casing 2 to be obtained, by a contribution of energy, namely by a laser beam or an electron gun.

The direction of printing of the part is shown by the arrow F1.

The print is made starting with the downstream end of the casing 2 (located at the bottom of FIG. 10), in order to minimize the number of supports needed and the risk of deformation of the excessively inclined walls.

Two supports are needed for the manufacturing.

A first substrate 61 is used to support the end wall 34 and the walls 32 and 33. This support 61 has protruding elements 610 (as many as there are channels 20 to be formed). Each protruding element 610 of substantially triangular section makes it possible to uphold the most inclined wall of the channel 20, located between the neck 204 and the outlet mouth 202.

A second support of 62 is used to support the annular rib 335 which is located horizontally with respect to the plate 6 during manufacturing.

Note that when the casing 2 is manufactured by an additive manufacturing method, the parts 322, 332 and 333 of the walls 32 and 33 respectively are inclined at an angle not exceeding 40 to the vertical, to be able to be manufactured with no supports.

Once the additive manufacturing is finished, a simple machining is sufficient to remove the supports 61 and 62 of the casing 2 obtained.

Finally, note that a dedusting hole 340, formed in the end wall 34 and opening onto the inside of the cavity 35 makes it possible to expel the remaining metallic powder in this cavity and makes it possible to pressurize this same cavity during the use of the casing 2. The number of holes 340 is identical to the number of channels 20.

Finally, the functional surfaces, i.e. the inner faces of the channels 20 forming the injectors and the surfaces that will be in contact with other parts are polished.

Figure 12:
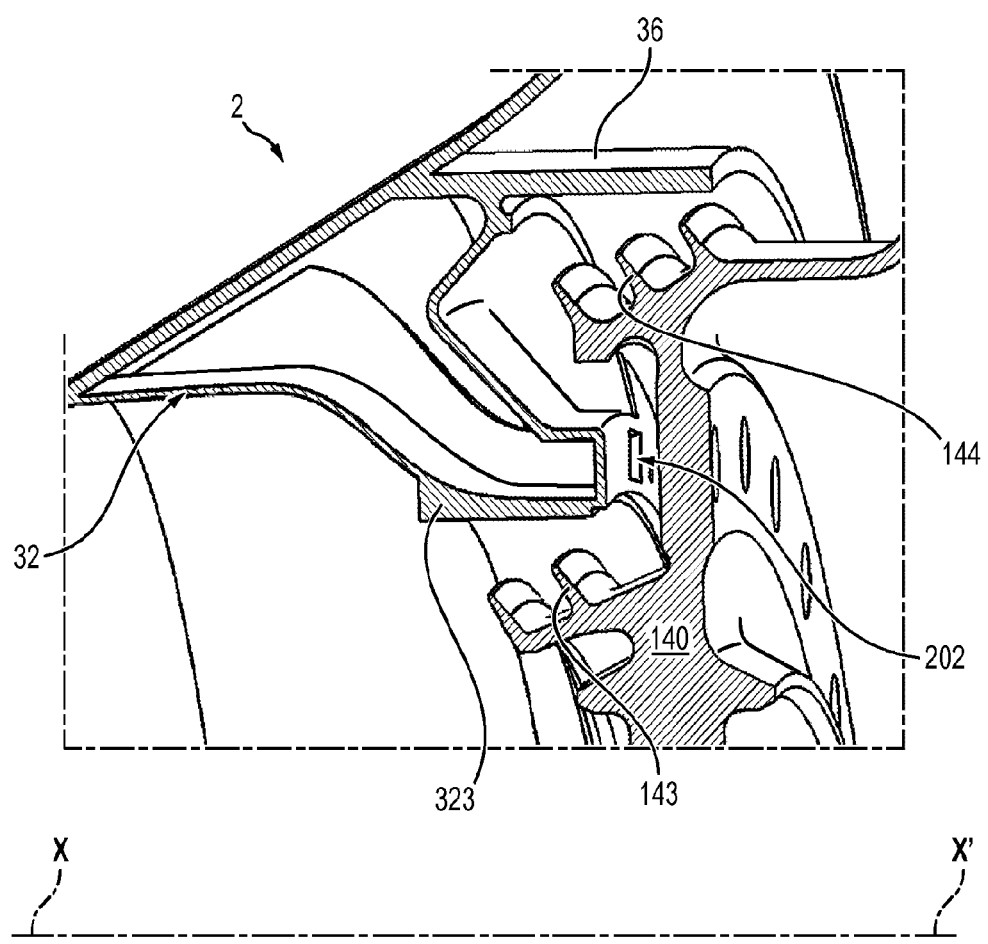
FIG. 12 is a perspective view of an angular portion of the annular cooling air injection casing in accordance with the invention and of an angular portion of a rotor disc to be cooled.

The casing 2 is then positioned facing the rotor disc 140, as shown in FIG. 12. This positioning is done such that the radially inner sealing device 4 (visible only in FIG. 3) and which is attached to the third part 323 of the wall 32 is facing the radially inner sealing tabs 143 of the disc 140 and the radially outer sealing device 5 (visible only in FIG. 3) and which is attached to the axial wall 36 is facing the radially outer sealing tabs 144 of the disc 140.

The invention has many advantages.

The reduction in the cross section and the inclination of the channels 20 forming the air injectors makes it possible to obtain a greater tangential velocity at the outlet mouth 202 than with the conventional injectors currently used (assembly of airfoils). A greater tangential velocity causes a lower relative total temperature of the cooling air and therefore better cooling of the rotor discs.

With this casing, a reduction in the leaks through the sealing devices 4 and 5 can also be seen.

Specifically, the leakage section through the devices 4 and 5 is defined as follows: $S=2*R*j$ where R is the radius of the sealing device 4 or 5 with respect to the engine centerline and j the clearance between the stator and the apices of each of the tips of the sealing device.

The leakage flow rate Q is: $Q=\rho*V*S$ where $\rho$ is the volume mass, V the air velocity through the sealing device.

As the outlet of the channels is located at a smaller radius (compared with straight- or constant-radius injectors in relation to the engine centerline), the devices 4 and 5 are themselves also located at a smaller radius R, so S decreases and thus the leakage flow rate Q also decreases.

Finally, the overall mass of the casing is reduced by over 50% by comparison with conventional injector casings.

The invention claimed is:

1. A cooling air injection casing for cooling a bladed rotor disc of a turbine of a turbomachine, wherein the cooling air injection casing extends around a longitudinal axis and is traversed by at least one channel forming an air injector, the at least one channel comprising an inlet mouth and an outlet mouth, wherein the at least one channel comprises a primary segment which extends in an axial plane from the inlet mouth of the at least one channel to an elbow and a secondary segment which extends from the elbow to the outlet mouth of the at least one channel, the secondary segment having a gradual variation in the orientation of the secondary segment along a tangential component between a section of the elbow and an outlet section of the outlet mouth, wherein the outlet mouth of the at least one channel has an outlet section which extends tangentially and in a plane perpendicular to the longitudinal axis of the cooling air injection casing, wherein the elbow is oriented such that the air stream exiting the outlet mouth circulates tangentially to the annular cooling air injection casing wherein the at least one channel has a reduction in section between an inlet section of the inlet mouth and a section of a neck, wherein the at least one channel has at least one corrugation in the primary segment of the at least one channel, such that the outlet mouth of the at least one channel is located nearer to the longitudinal axis of the cooling air injection casing than the inlet mouth, wherein the casing comprises:

a flared annular outer wall flared from upstream to downstream, a radially inner wall which extends downstream from the flared annular outer wall and which supports a radially inner sealing device, a radially outer wall which extends from the flared annular outer wall, and an end wall which joins a downstream end of the radially inner wall and a downstream end of the radially outer wall the end wall extending in a plane perpendicular to the longitudinal axis of the cooling air injection casing, wherein the flared annular outer wall, the radially inner wall, the radially outer wall and the end wall together delimit an annular inner cavity, wherein the at least one channel is disposed at least in part in the inner cavity, and wherein the outlet mouth of the at least one channel is formed in the end wall.

2. The casing as claimed in claim 1, wherein the at least one corrugation of the at least one channel comprises from upstream to downstream with respect to a direction of circulation of the cooling air in the at least one channel, a first curved part, the concavity of which is oriented toward the longitudinal axis of the cooling air injection casing, then a second curved part, the convexity of which is oriented toward the longitudinal axis of the cooling air injection casing.

3. The casing as claimed in claim 1, wherein the ratio of the inlet section of the inlet mouth to the section of the neck is greater than or equal to 2.

4. The casing as claimed in claim 3, wherein the ratio of the inlet section of the inlet mouth to the section of the neck is between 2 and 10.

5. The casing as claimed in claim 1, wherein the reduction in the section of the at least one channel between the inlet mouth and the neck is strictly monotonically decreasing.

6. The casing as claimed in claim 1, wherein the inlet mouth of the at least one channel is formed in the flared annular outer wall and is of rectangular shape.

7. The casing as claimed in claim 1, wherein the inlet mouth of the at least one channel comprises a tube of circular section, which protrudes axially and upstream from the flared annular outer wall.

8. The casing as claimed in claim 1, wherein the casing comprises an annular wall which extends axially downstream from the radially outer wall and which supports a radially outer sealing device.

9. The casing as claimed in claim 1, wherein the end wall comprises at least one dedusting hole.

10. The casing as claimed in claim 1, wherein the outlet mouth is of rectangular shape.

11. A high-pressure turbine of a turbomachine comprising at least one bladed rotor disc equipped with a hub, wherein the high-pressure turbine comprises a cooling air injection casing as claimed in claim 1, and wherein the cooling air injection casing is disposed upstream of the at least one bladed rotor disc such that the outlet mouth of the at least one channel is located facing the hub and the elbow of the at least one channel of the cooling air injection casing is oriented such that the air stream exiting the outlet mouth circulates in the same direction as the direction of rotation of the bladed rotor disc intended to be cooled by the cooling air injection casing.

12. A turbomachine wherein the turbomachine comprises a cooling air injection casing as claimed in claim 1.

13. A method for manufacturing a cooling air injection casing as claimed in claim 1, by additive manufacturing.

\* \* \* \* \*